United States Patent Office 3,541,416
Patented Nov. 17, 1970

3,541,416
MOTOR CONTROL SYSTEM WITH BEMF SAMPLING ONLY WHEN ARMATURE IS COASTING
Joseph T. Woyton, South Bend, Ind., assignor to Reliance Electric and Engineering Company, Cleveland, Ohio, a corporation of Ohio
Filed Dec. 26, 1967, Ser. No. 693,260
Int. Cl. H02p 5/06, 7/30
U.S. Cl. 318—331     13 Claims

ABSTRACT OF THE DISCLOSURE

A DC motor control system utilizing a pulsating DC current in conjunction with the silicon controlled rectifier as a switching device, in which armature voltage feedback is used to control the silicon controlled rectifier and regulate the speed of the motor. The silicon controlled rectifier voltage which normally is present in the feedback circuit is removed so that the signal represents only the voltage from the armature while the armature is coasting and hence is a true indication of the motor speed.

Figure 1:
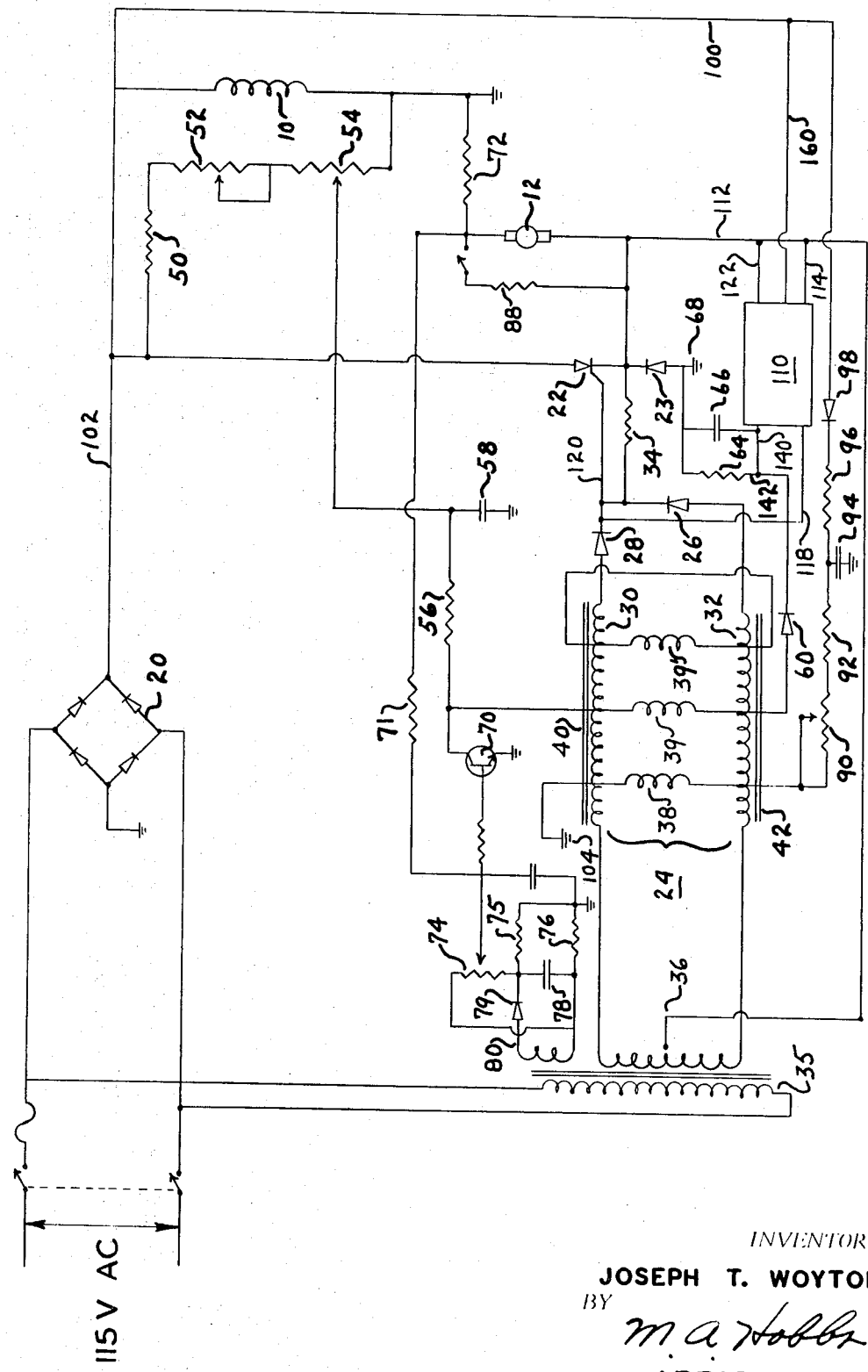

In DC motor control systems utilizing a pulsating DC current in conjunction with a silicon controlled rectifier as a switching device, the DC current to the motor is normally controlled in response to a variable signal representing load on the motor and the desired speed as determined by a pre-set or manually operated control. The silicon controlled rectifier (SCR) is controlled by a trigger circuit which causes the silicon controlled rectifier to fire intermittently in accordance with the signal and thereby supply the required current to the motor to satisfy load and speed requirements. In some systems the control signal for the SCR is controlled by a feed-back system from the motor which senses armature voltage, and hence in effect senses armature speed and load on the motor, and produces a signal in response to the voltage. The feed-back signal from the armature causes the silicon controlled rectifier to increase the current flowing to the motor when the load is increased and to decrease the current flowing to the motor when the load is lightened in order to maintain the speed of the motor substantially constant. In the past, the armature current received by the feed-back circuit and the signal produced thereby for triggering the silicon controlled rectifier have not been proportional to the speed of or the load on the motor since the current from the armature includes the voltage from the silicon controlled rectifier. For example, if the motor is running under a specific condition and the load is increased, the motor tends to slow down, thus resulting in a decrease in armature voltage. Upon sensing the decreased voltage, the feed-back circuit produces a signal calling for more current to the motor to return the speed to the preselected rate.

The armature voltage is fundamentally composed of two parts, the first part being the armature voltage, which is essentially a DC voltage generated by the armature functioning as a generator while the silicon controlled rectifier is inoperative, and the second part being the pulsating DC voltage from the full-wave bridge passing through the silicon controlled rectifier to the armature into the feed-back circuit. This latter voltage rises well above the normal armature generated voltage, and hence causes the feed-back speed control circuit to produce a speed signal not truly representing motor speed or load. It is therefore one of the principal objects of the present invention to provide a means, for use in conjunction with the aforementioned type motor control system, to gate out or remove the silicon controlled rectifier component from the voltage transmitted from the armature to the speed control circuit, permitting only the voltage generated by the armature to pass to the speed control circuit.

In some motor control systems, the voltage transmitted to the speed control circuit is not produced by the motor, but rather by a separate tachometer driven by the motor; thus while obtaining a signal representative of armature speed, it increases the size and cost of the system over and above those systems utilizing the motor direct. The control system involving the present invention utilizes the armature voltage of the motor and obtains a speed control signal as accurate as that obtained by the use of a separate tachometer, truly representing motor speed, and it is, therefore, another object to provide a relatively simple and reliable circuit which can readily be incorporated into a basic standard motor control system and which derives the voltage for the speed signal solely from the motor controlled by the system.

Figure 2:
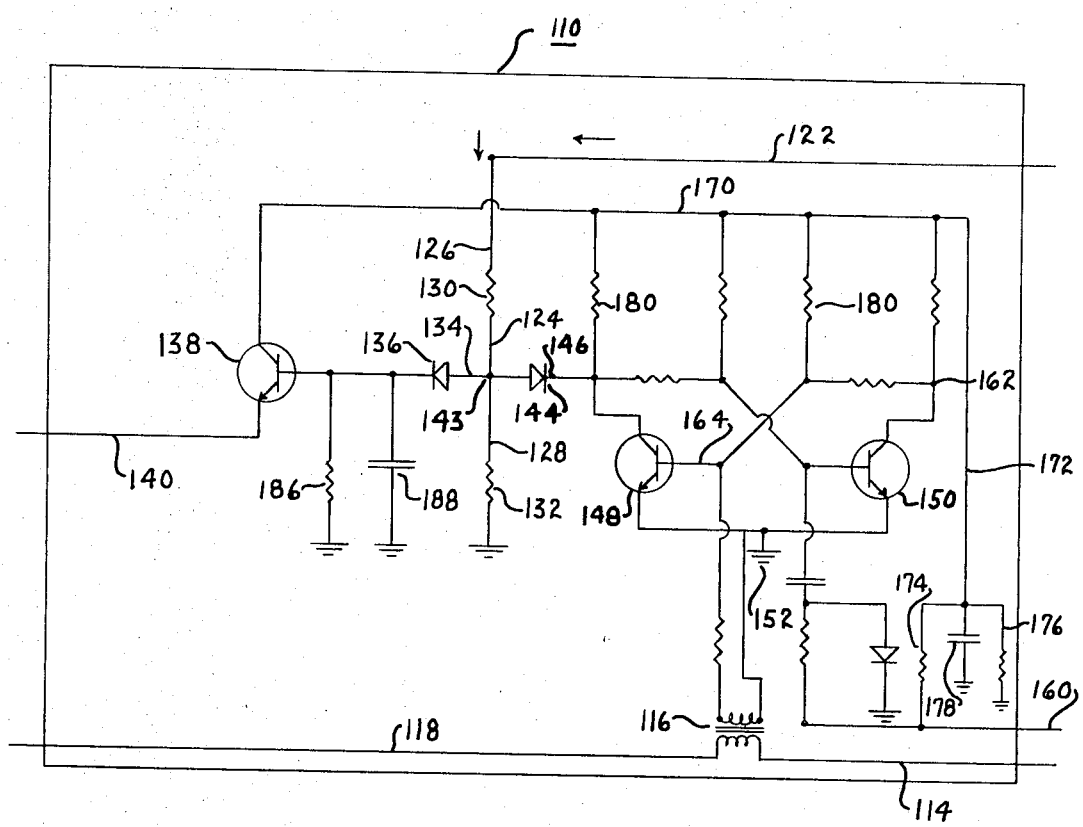

Additional objects and advantages of the present invention will become apparent from the following description and accompanying drawings, wherein:

FIG. 1 is a schematic diagram of an electrical motor control system showing the circuit embodying the primary part of the present invention in a block connected into the basic control circuit; and FIG. 2 is a schematic diagram of an armature voltage feed-back circuit embodying the invention.

Referring to the drawings, the motor to be controlled consists of a field winding 10, and an armature 12, and the direct current necessary to operate the motor is derived from rectifier bridge 20. Field winding 10 is connected directly between bridge 20 and ground and is thus always operated at the same potential. Armature 12, however, receives its operating voltage through silicon controlled rectifier 22. Part of the voltage regulator circuit is composed of the silicon controlled rectifier and diode 23, and the voltage and current flowing into armature 12 are regulated by the SCR 22. The SCR, in turn, is controlled by a magnetic amplifier 24, through rectifiers 26 and 28, load current windings 30 and 32 of the magnetic amplifier acting upon resistor 34 as their common load, with the gate of SCR 22 sensing variations in voltage across said load. Power for the operation of the magnetic amplifier 24 is taken from transformer 35, the center tap 36 of which is connected to the side of the load resistor 34 opposite rectifiers 26 and 28 in a standard configuration requiring no further explanation. Bias winding 38 and control winding 39 of magnetic amplifier 24 regulate, by varying the amount of saturation of the cores of the magnetic amplifier, the impedance of load windings 30 and 32, thus regulating the current and voltage flowing through the load windings and the current flowing to the resistor 34 and SCR 22. The method of control for bias and control windings 38 and 39, respectively, will be described in detail hereinafter. Damper winding 39' serves to smooth out the response of the magnetic amplifier and, being of a standard configuration, will not be described in detail herein.

Control winding 39 is the primary speed control and an increase in the current through this winding results in an increase in the saturation of the cores 40 and 42 of magnetic amplifier 24, causing a decrease in the impedance of load windings 30 and 32, and a subsequent increase in the speed of the motor. The voltage to winding 39 is derived from rectifier bridge circuit 20, through voltage divider resistor 50, potentiometers 52 and 54, and fixed resistor 56. Storage capacitor 58 serves to produce a progressive timed starting ramp, and on energization, will be charged from bridge 20 through resistances 50, 52 and 54 in the well known exponential manner. It also serves to reduce ripple components of current in control winding 39. After passing through control winding 39, the current passes through blocking diode 60 and the voltage divider circuit consisting of resistor 64 and storage capacitor 66 and thence to ground 68.

The current through control winding 39 and therefore the speed of the motor, are variably controlled by rheostat 52, which limits the maximum speed of the motor, and by potentiometer 54, which varies the speed of the motor to satisfy requirements.

By providing a secondary ground return for the positive EMF coming off resistor 56, the circuit consisting of transistor 70 and its associated biasing circuitry, acts as a current limiter, in effect countering the direct action of the speed control 54 in accordance with the bias on the base of transistor 70. The effect of this circuit is to bypass current applied to winding 39 when the motor armature current exceeds a pre-established value. This is accomplished by applying a current through resistor 71 to the base of transistor 70. This current is poled in a direction to induce conduction of transistor 70 and the current being derived from resistor 72 carrying motor armature current is proportional thereto. The base of transistor 70 is also being supplied with a determinate value of reference current through potentiometer 74, dividers 75 and 76 from capacitor 78, diode 79 and transformer winding 80. This reference current is poled to hold the transistor non-conducting, opposing the effect of the current being supplied through resistor 71. Transistor conduction occurs when the current through 71, proportional to armature current, overcomes the oppositely poled reference, the transistor conduction having the effect of diverting or by-passing the current through control winding 39 which would otherwise produce greater armature current.

Resistor 88 is a dynamic braking resistor which is operative in the circuit only when power has been removed from the armature and the motor is slowing down. It serves as a circuit for draining off the current produced by the armature as it slows down and permits quicker and smoother braking of the motor.

The foregoing description has been primarily concerned with the circuit while it is energized. Referring now to the condition which prevails when power is removed from the circuit, storage capacitor 58 is left charged, but has lost its charging potential and therefore begins to discharge slowly just as it provided the time ramp start on energization. When the power is removed, it discharges through speed control 54 and thence to ground and simultaneously through control winding 39 and its associated circuitry. The former path has no detrimental effect, but the latter does. In the event the cores of magnetic amplifier 24 were saturated when the circuit was energized, the load coils 30 and 32 would have a low impedance, and when the circuit was energized, current would surge through the magnetic amplifier causing a concomitant surge of current through the armature 12 of the motor. This surge of current would cause the motor to lurch when it was first turned on, and the magnitude of the current could be sufficient to damage the semi-conductor components. In any case, the sudden lurch is undesirable in that it may cause damage to the machinery to which the motor is connected or may be hazardous to personnel. Thus, it is undesirable to have the cores of the magnetic amplifier saturated when the circuit is first energized; however, in the control system thus far described, when the circuit is de-energized, the current flowing from storage capacitor 58 through control winding 39 is sufficient to bring the cores of the magnetic amplifier close to saturation. In order to overcome this adverse condition, a prebiased circuit is included, consisting of bias winding 38 of magnetic amplifier 24, bias control potentiometer 90, divider resistor 92, storage capacitor 94, surge resistor 96 and isolating diode 98. It derives its operating power from rectifier bridge 20 through leads 100 and 102 connecting diode 98 with the bridge. While the entire motor speed control circuit is energized, the power from rectifier bridge 20 flows through isolation diode 98 to surge resistor 96, the purpose of which is to protect diode 98 from an excessive flow of current into capacitor 94 while it is initially charging. The power flows from the surge resistor 96 through maximum bias limiter resistor 92, through bias control potentiometer 90 and through bias winding 38 to ground 104. The polarity of the bias winding is such that its magnetic field directly opposes that of control winding 39; thus the two fields would cancel each other if one were not greater than the other. However, the amplitude of the magnetic field of control winding 39 is sufficient to overcome the opposing effect of bias winding 38 under running conditions. When the circuit is de-energized, storage capacitor 94, being blocked by diode 98 from discharging elsewhere, can only discharge through bias winding 38. Therefore, more current flows through bias winding 38 than through control winding 39 after shutdown, and consequently, the adverse effect of the current flowing through control winding 39 is counteracted. The size of capacitor 94 is sufficient that the length of time that a discharge controlled by the time constant of the RC circuit, consisting of capacitor 94 and resistors 90 and 92, far exceeds the discharge time of capacitor 58, the discharge rate of the latter primarily being controlled by the time constant of the circuit consisting of capacitor 58 and potentiometer 54. Therefore, capacitor 94 is effective in the circuit after shutdown sufficiently long, not only to counteract the adverse effect of the discharge of capacitor 58, but to bring the saturation point of the cores 40 and 42 from their previous loaded operating point back to the safe saturation point necessary for starting the motor without producing the surge of current to the armature.

The main feed-back system, indicated in FIG. 1 by block 110 and shown in detail in FIG. 2, is connected to lead 112 from the motor armature and transmits armature voltage through lead 114, transformer 116, and lead 118 to 120 in the main control system. The two leads 114 and 118 in effect connect across the gate or control lead to SCR 22 and to the reference lead from the SCR. When the SCR is activated, the current passing from lead 114 to lead 118 in control unit 110 activates the present gating circuit in the control unit 110. The armature voltage utilized to control speed of the motor is transmitted from lead 112 through lead 122 and through divider circuit 124 consisting of leads 126 and 128 and their respective resistors 130 and 132. The current is transmitted through lead 134 and diode 136 to transistor 138 which is activated by this current to produce a signal in lead 140 connected to line 142 of the main control system. With the system thus far described, the current transmitted from the armature voltage lead 112 through lead 122 contains the two parts, referred to previously herein, consisting of the armature voltage produced while the armature is coasting and the pulsating DC voltage passing through the SCR, the latter voltage causing a signal in lead 140, not truly representative of motor speed or load.

In order to remove the SCR component from the voltage from the armature, a special circuit is incorporated in the system consisting primarily of the circuitry shown to the right of junction 143, as seen in FIG. 2 of the drawings, and including diode 144 in lead 146, transistors 148 and 150 and their operating circuitry. The gating signal from the saturable reactor transmitted through lead 118 to transformer 116 activates the circuitry, placing transistor 148 in the "on" state, which will remain in that state until deactivated. Simultaneously with the activation of transistor 148, transistor 150 is deactivated; thus the voltage transmitted through leads 122 and 126 to junction 143 is shunted to ground through diode 144, transistor 148 and ground 152. While transistor 148 is in its activated state, no current passes through diode 136 to transistor 138.

At the completion of the SCR firing cycle, the current in lead 100 from the rectifier bridge is transmitted through lead 160, activating transistor 150, thereby maintaining the voltage at point 162 relatively low and thus causing the voltage in lead 164 of transistor 148 to remain low; thus, while transistor 150 continues in its activated state, transistor 148 continues in its deactivated state, causing the voltage at junction 143 to assume armature voltage potential. With the system in the foregoing state, the voltage transmitted through leads 122 and 126 is transmitted to transistor 138 which produces a signal representative of armature speed. When lead 118 is energized by the firing of SCR 22, the voltage at point 164 is raised to the level where transistor 148 is again reactivated by the current from transformer 116, and hence the current from lead 146 passes through transistor 148 to ground 152. The cycle is repeated in response to the voltage in the bridge circuit transmitted through leads 100 and 160 in the manner just described. Thus, when the SCR voltage is present in lead 112 from the armature, transistor 148 is in operation to remove the SCR component from the current, thereby permitting merely the voltage produced by the coasting armature to be sensed by transistor 138.

The source of power for producing a usable signal from the present feed-back system includes leads 170 and 172 and the power network consisting of a voltage divider connected to lead 160 and having resistors 174 and 176 and capacitor 178 to reduce the voltage down to a suitable level. The current supplied through this circuitry is transmitted to transistor 138 and thence to leads 140 and 142. A series of load resistors 180 are included for the purpose of producing a latching action on transistors 148 and 150.

In order to produce a continuous signal representative of armature speed notwithstanding the intermittent interruption of the current from the armature while the SCR voltage is being removed from the current, a time delay circuit consisting of resistor 186 and capacitor 188, maintains a substantially constant flow of current to transistor 138 when the current from leads 122 and 126 is shunted through diode 144 and transistor 148. The level of the current from the time delay circuit corresponds substantially to the current being supplied solely by the armature while it is coasting.

While the present feed-back system for producing a signal representative of armature speed is shown used in conjunction with the type of main control system of FIG. 1, the broad concept of the invention contemplates the use of this type of feedback system in conjunction with other types of motor control systems in which the armature voltage can be utilized to obtain a speed control signal for the motor. While only one embodiment of the present motor control feed-back circuit has been described in detail herein, various changes and modifications may be made in the main and feed-back systems without departing from the scope of the invention.

I claim:

1. In a motor control system having a silicon controlled rectifier, a triggering circuit for said rectifier, a control means for said triggering circuit, a first lead connected to said rectifier for a pulsating DC current, a second lead connecting said triggering circuit to said rectifier and a third lead connecting said rectifier to the armature of the motor: a speed control system for producing a signal representative of armature speed for controlling said rectifier, comprising a feed-back circuit connecting said third lead to said triggering circuit control means for receiving a voltage signal from said armature and producing a signal in response to the voltage thereof, and circuit means in said feed-back circuit for removing from said armature voltage signal the voltage component from said rectifier output and utilizing the remainder of said armature voltage to produce the signal representative of armature speed.

2. A speed control system as defined in claim 1 in which a switching means is incorporated in said circuit means for removing the signal component from said third lead during the time said silicon controlled rectifier is operating.

3. A speed control system as defined in claim 2 in which said switching means includes a transistor and a diode.

4. A speed control system as defined in claim 3 in which said circuit means includes a second transistor for controlling said transistor in response to the pulsating current in said first lead.

5. A speed control system as defined in claim 1 in which a transistor controls the signal output in response to the signal received from said third lead as modified by said circuit means.

6. A speed control system as defined in claim 5 in which said transistor is connected to a source of current and to said control system.

7. A speed control system as defined in claim 6 in which a time delay circuit is incorporated in the lead to said last mentioned transistor for maintaining a substantially constant signal representative of armature speed.

8. A speed control system as defined in claim 4 in which a transistor controls the signal output in response to the signal received from said third lead as modified by said circuit means.

9. A speed control system as defined in claim 3 in which said transistor is initially activated by a circuit including a transformer having a lead connected to said third lead and another lead connected to said second lead.

10. A speed control system as defined in claim 1 in which said circuit means includes a capacitor for maintaining a substantially constant voltage while said circuit means is in a state of removing said rectifier output voltage.

11. A speed control system as defined in claim 5 in which a capacitor is connected to the lead to said last mentioned transistor for maintaining a substantially constant signal representative of armature speed.

12. A speed control system as defined in claim 1 in which the triggering circuit includes a magnetic amplifier and in which said first lead is connected to a rectifier bridge.

13. A speed control system as defined in claim 9 in which the triggering circuit includes a magnetic amplifier and in which said first lead is connected to a rectifier bridge.

References Cited

UNITED STATES PATENTS 3,389,319  6/1968  Raber _____ 318—331 X
3,413,494  11/1968  Wisman _____ 318—345 X ORIS L. RADER, Primary Examiner T. LANGER, Assistant Examiner U.S. Cl. X.R.
318—345